(12) United States Patent
Sogabe

(10) Patent No.: US 7,813,081 B2
(45) Date of Patent: Oct. 12, 2010

(54) MAGNETIC TAPE CARTRIDGE WITH WRITE PROTECT MEMBER MOVABLE TO IRREVERSIBLY RETAINING POSITION

(75) Inventor: Teruo Sogabe, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 570 days.

(21) Appl. No.: 11/292,120

(22) Filed: Dec. 2, 2005

(65) Prior Publication Data

US 2006/0126225 A1 Jun. 15, 2006

(30) Foreign Application Priority Data

Dec. 8, 2004 (JP) .............................. 2004-355791

(51) Int. Cl.
*G11B 23/04* (2006.01)
*G11B 15/04* (2006.01)
(52) U.S. Cl. ..................... 360/132; 360/60; 242/357
(58) Field of Classification Search ............... 360/132, 360/60; 242/338.1, 348.1, 348.2, 344, 357
See application file for complete search history.

(56) References Cited

U.S. PATENT DOCUMENTS

| 4,320,421 | A | * | 3/1982 | Larson et al. | ................. 360/60 |
| 4,348,707 | A | * | 9/1982 | Maly et al. | .................. 360/132 |
| 4,814,923 | A | * | 3/1989 | Kawada et al. | .............. 360/132 |
| 4,844,378 | A | * | 7/1989 | Oishi | .......................... 242/344 |
| 5,504,644 | A | * | 4/1996 | Sasaki et al. | ................. 360/132 |
| 5,699,216 | A | * | 12/1997 | Doty | .......................... 360/132 |
| 5,786,967 | A | * | 7/1998 | Gerfast et al. | ............... 360/132 |
| 6,744,595 | B2 | * | 6/2004 | Blair et al. | ................... 360/132 |
| 6,866,216 | B2 | * | 3/2005 | Hiraguchi | ................ 242/348.2 |
| 7,048,220 | B2 | * | 5/2006 | Davis | ......................... 242/348 |
| 2006/0132974 | A1 | * | 6/2006 | Sogabe | ....................... 360/132 |

FOREIGN PATENT DOCUMENTS

| JP | 05-036233 | 2/1993 |
| JP | 6-84583 | 12/1994 |
| JP | 10-112161 | 4/1998 |
| JP | 2004-95069 A | 3/2004 |

* cited by examiner

*Primary Examiner*—Craig A. Renner
(74) *Attorney, Agent, or Firm*—Birch, Stewart, Kolasch & Birch, LLP

(57) ABSTRACT

A tape cartridge includes a case, a magnetic tape stored in the case, and a write protect structure for blocking information recording onto the magnetic tape, in which the write protect structure includes, for example, a slidable write protect member and a retention member (e.g., a guide wall) capable of retaining the write protect member in a specified position, and the retention member is capable of reversibly retaining the write protect member at least in a first position and a second position and irreversibly retaining the write protect member in a third position.

8 Claims, 9 Drawing Sheets

MAGNETIC TAPE CARTRIDGE WITH WRITE PROTECT MEMBER MOVABLE TO IRREVERSIBLY RETAINING POSITION

BACKGROUND OF THE INVENTION

The present invention relates to a tape cartridge.

Tape cartridges have write protect structure which makes it possible to block information recording onto magnetic tapes when users so desire. The write protect structure has, for example, a write protect member capable of sliding horizontally or vertically. In such conventional write protect structure, the tape cartridges set to be in an unrecordable state may once again be put in a recording state, which allows data rewrite according to need (see, e.g., JP 2004-95069 A).

The propriety of recording is determined by, for example, inserting a detection member of a drive into a sensor hole formed on a case and detecting the position of the write protect member. For example, when the detection member with a specified length is inserted into the sensor hole, recording is determined to be possible if the detection member comes into contact with the write protect member, whereas recording is determined to be impossible if the detection member does not come into contact with the write protect member.

A type of tape cartridges in which rewrite access is inhibited upon breaking of a pawl has also been known.

However, in the conventional tape cartridges having a slidable write protect member, it is possible to allow data rewrite by putting the tape cartridges in an unrecordable state and then putting them once again in a recordable state, but it is impossible to prevent falsification of recorded data. In the type of the tape cartridges in which rewrite access is inhibited upon breaking of a pawl, it is not possible to put the tape cartridges in a recording state once the pawl is broken, and therefore it is not possible to temporarily put the tape cartridges in an unrecordable state and then put them once again in a recordable state when needed.

SUMMARY OF THE INVENTION

An object of the present invention is to provide a tape cartridge allowing switchover between a recordable state and an unrecordable state and enabling users to put the tape cartridge in a permanently unrecordable state at an arbitrary time when users determine that data needs to be protected.

A tape cartridge in the present invention includes a case, a magnetic tape stored in the case, and a write protect structure for blocking information recording onto the magnetic tape, in which the write protect structure includes a slidable or rotatable write protect member and a retention member capable of retaining the write protect member in a specified position, and the retention member is capable of reversibly retaining the write protect member at least in a first position and a second position and irreversibly retaining the write protect member in a third position.

It is to be noted that in the present specification, the term "position" refers not only a location and a place but also a posture (orientation). In the present invention, therefore, the first position, the second position and the third position may be locations different from each other as well as identical locations with different postures (orientation).

In the tape cartridge of the present invention, the retention member is capable of reversibly retaining the write protect member at least in a first position and a second position and irreversibly retaining the write protect member in a third position, which allows switchover between a recordable state and an unrecordable state and enables users to put the tape cartridge in a permanently unrecordable state at an arbitrary time when users determine that data needs to be protected.

BRIEF DESCRIPTION OF THE DRAWINGS

The present invention will be further described with reference to the accompanying drawings wherein like reference numerals refer to like parts in the several views, and wherein:

FIG. 1A is a perspective view showing one example of a tape cartridge of a first embodiment, while

FIG. 6A is a perspective view showing one example of a tape cartridge of a third embodiment, while

FIG. 7A is a plane view showing a write protect member constituting the tape cartridge shown in FIG. 6A in the state of being retained in a first position, while

FIG. 8A is a plane view showing the write protect member constituting the tape cartridge shown in FIG. 6A in the state of being retained in a second position, while FIG. 9A is a plane view showing the write protect member constituting the tape cartridge shown in FIG. 6A in the state of being retained in a third position, while

DETAILED DESCRIPTION OF THE PREFERRED EMBODIMENTS

First Embodiment

Figure 1A:
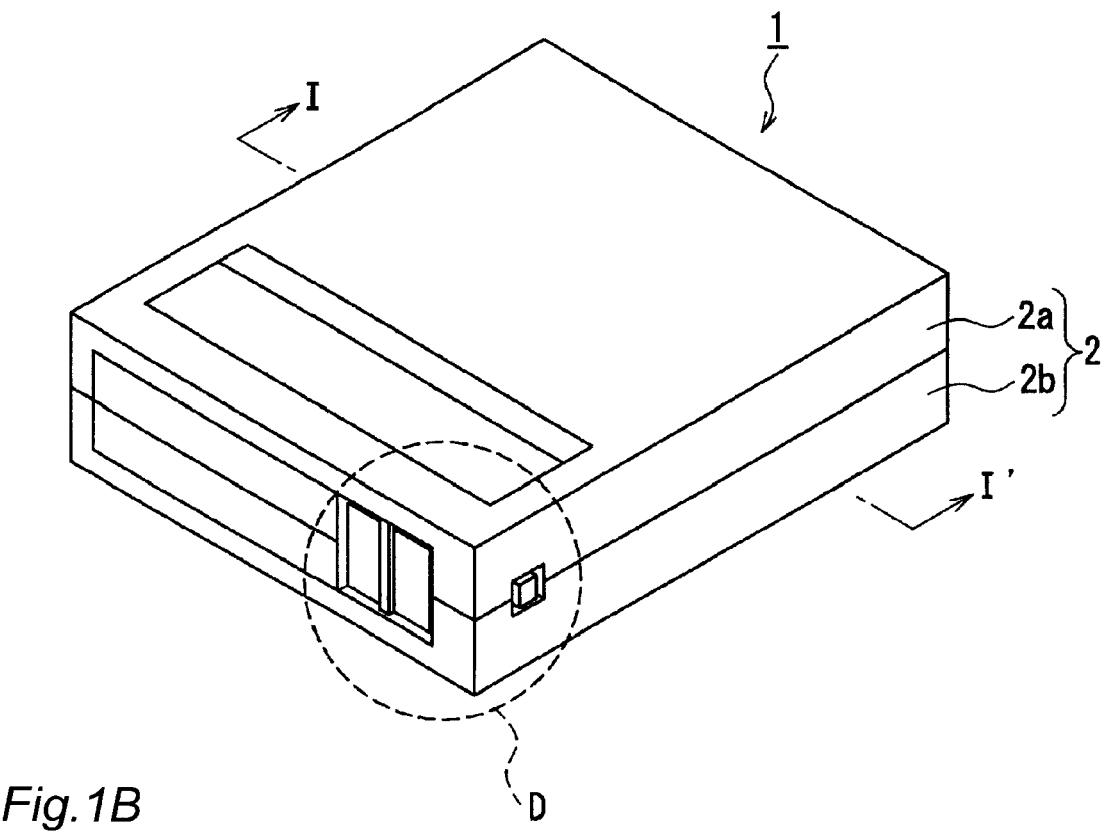
Figure 1B:
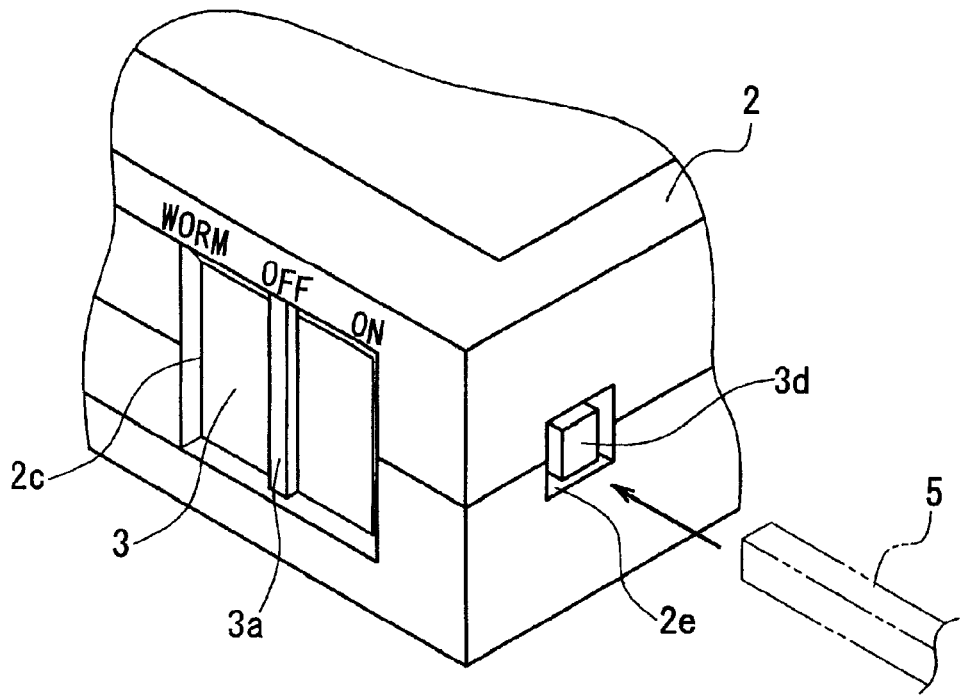
FIG. 1B is an enlarged view showing a section D in FIG. 1A.
Figure 2:
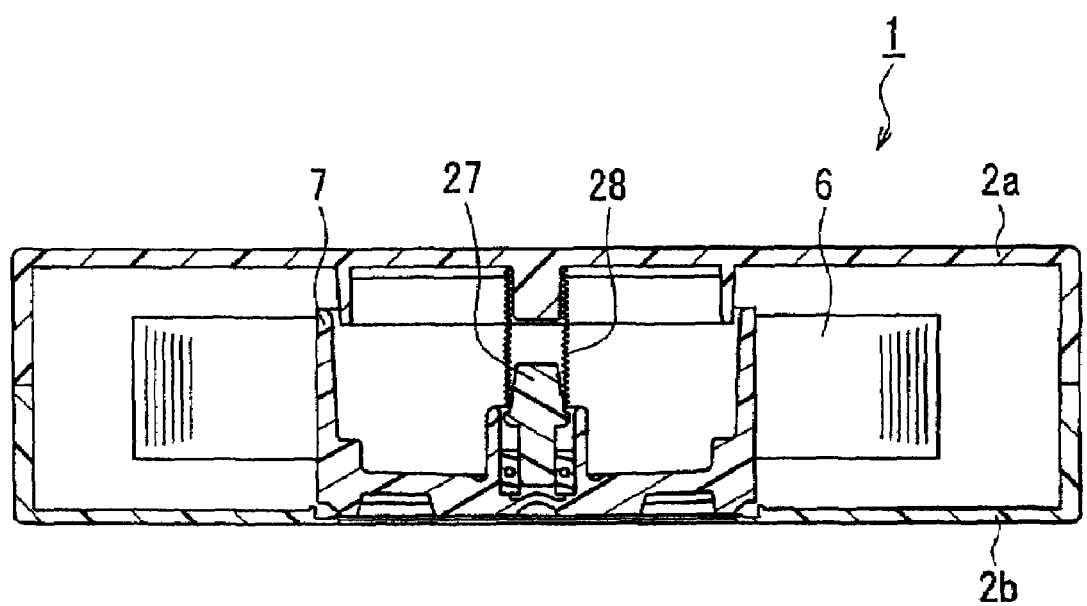
FIG. 2 is a cross sectional view taken along line I-I' in the tape cartridge shown in FIG. 1A.
Figure 3A:
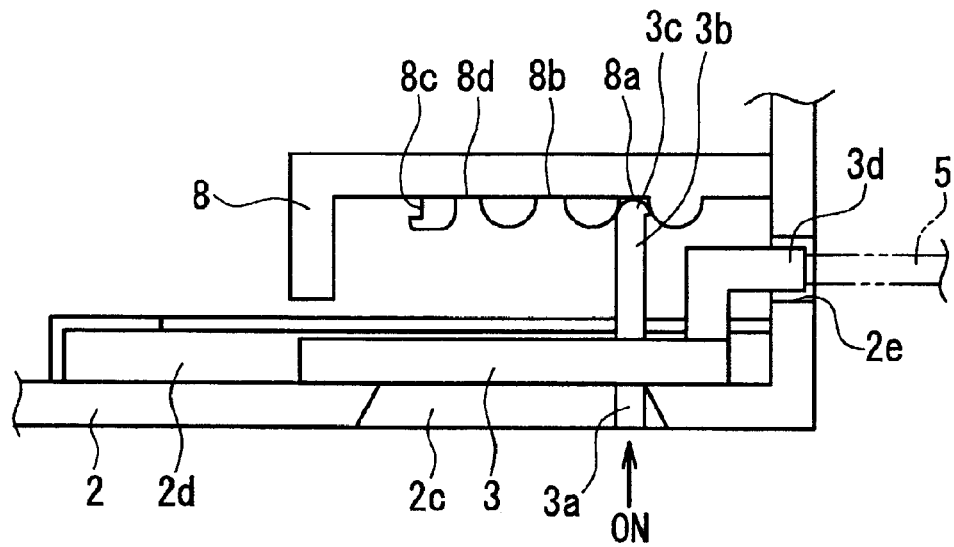
FIG. 3A is a plane view showing a write protect member constituting the tape cartridge shown in FIG. 1A in the state of being retained in a first position.
Figure 3B:
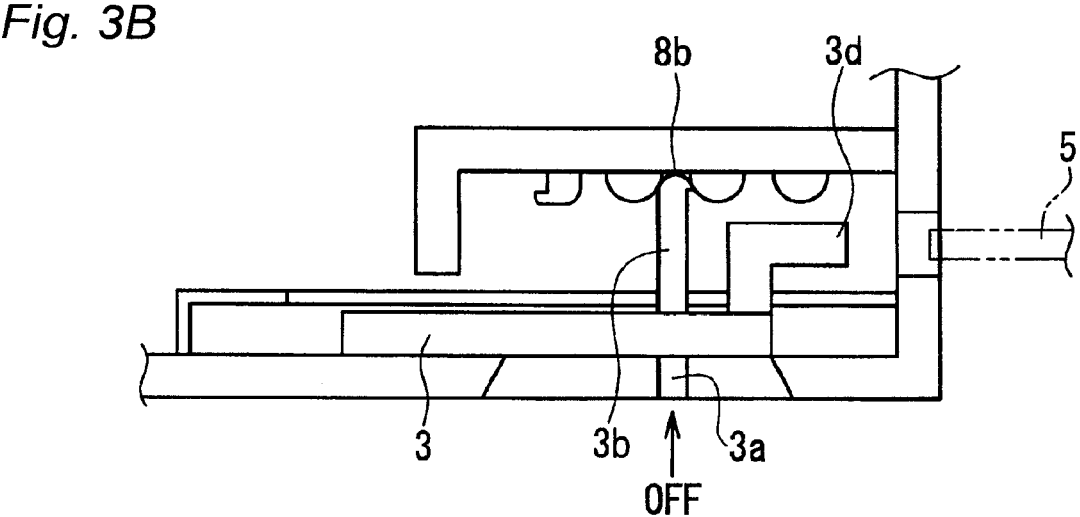
FIG. 3B is a plane view showing the write protect member in the state of being retained in a second position.
Figure 3C:
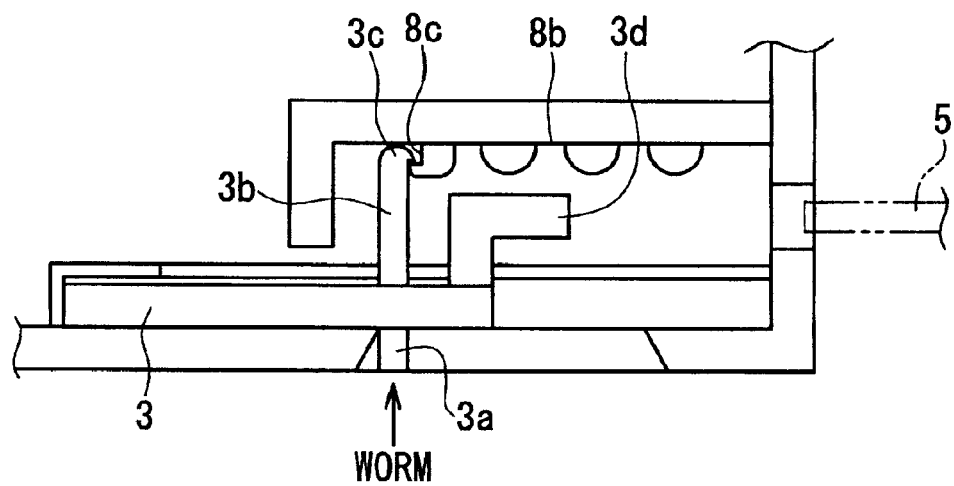
FIG. 3C is a plane view showing the write protect member in the state of being retained in a third position.

FIG. 1A is a perspective view showing a tape cartridge in this embodiment, while FIG. 1B is an enlarged view showing a section D in FIG. 1A. FIG. 2 is a cross sectional view taken along line I-I' of the tape cartridge shown in FIG. 1A. FIGS. 3A to 3C are plane views showing one example of a write protect structure in the tape cartridge shown in FIG. 1A without an upper cover 2a in FIG. 1A.

As shown in FIGS. 1A. 1B and 2, the tape cartridge 1 in the present embodiment includes a case 2 and a magnetic tape 6 stored in the case 2. The case 2 is formed from an upper cover 2a and a lower cover 2b which are joined by screws and the like. The magnetic tape 6, which is wound around a reel 7 that is rotatably housed in the case 2, is feedable from the case 2. In the case 2, the reel 7 is depressed downward as viewed in the drawing by a helical compression spring 28 acting through a shaft 27. This prevents the reel 7 not in use from idly rotating.

The tape cartridge 1 includes, for example, a write protect structure as described below. The write protect structure is provided for the purpose of blocking information recording onto the magnetic tape 6 when users so desire.

As shown in FIG. 1B and FIG. 3A, the write protect structure includes a write protect member 3 and a guide wall 8. The guide wall 8 has a function as a retention member capable of retaining the write protect member 3 in a specified position. The write protect member 3 is slidable in a specified range along, for example, a guide groove 2d formed on the case 2.

The write protect member 3 includes a tab portion 3a and an engagement piece 3b protruding to the inside of the case 2. The engagement piece 3b has a protrusion 3c on its top end. It is preferable that the engagement piece 3b is, for example, in an almost rod shape, and can elastically deformed upon coming into contact with the guide wall 8. The tab portion 3a is disposed within an operation window 2c formed on, for example, the rear face of the case 2 for allowing operation of the write protect member 3 from the outside of the case 2. The tab portion 3a is horizontally slidable by the hand, and can be disposed below the words "ON", "OFF" and "WORM (Write Once Read Many)" displayed above the operation window 2c.

The guide wall 8 is fixed onto the case 2 so as to be orthogonal to the engagement piece 3b. The guide wall 8 has a first engagement portion 8a, a second engagement portion 8b and a third engagement portion 8c formed in this order along the sliding direction of the write protect member 3. The guide wall 8 includes a plate portion disposed in parallel with the sliding direction of the write protect member 3, and the first engagement portion 8a, the second engagement portion 8b and the third engagement portion 8c are formed on a face of the plate portion facing the write protect member 3.

A sensor hole 2e is formed on, for example, a lateral face of the case 2. The propriety of recording onto the magnetic tape is determined by, for example, whether a detection member 5 of the drive comes into contact with a part (detection target portion 3d) of the write protect member 3 visible from the sensor hole 2e.

As shown in FIGS. 1B and 3A, when the tab portion 3a is disposed below the word "ON", the engagement piece 3b is retained by the first engagement portion 8a, and the write protect member 3 is retained in a first position (in other words, temporal engagement between the engagement piece 3b and the first engagement portion 8a makes the write protect member 3 to be retained in the first position by the guide wall 8).

In the state that the write protect member 3 is retained in the first position, the detection target portion 3d of the write protect member 3 is present, for example, inside the sensor hole 2e. When the tape cartridge in this state is loaded into the drive, the detection member 5 of the drive comes into contact with the detection target portion 3d of the write protect member 3, and so the drive recognizes that the tape cartridge is in a recordable state.

Next, as shown in FIG. 1B and FIG. 3B, when the tab portion 3a is disposed below the word "OFF", the engagement piece 3b is retained by the second engagement portion 8b, and the write protect member 3 is retained in a second position (in other words, temporal engagement between the engagement piece 3b and the second engagement portion 8b makes the write protect member 3 to be retained in the second position by the guide wall 8). At this time, the detection target portion 3d of the write protect member 3 has been pulled inside the case 2. When the tape cartridge in this state is loaded into the drive, the detection member 5 of the drive does not come into contact with the detection target portion 3d. Thus, the drive recognizes that recording onto the magnetic tape is not allowed. However, if the tab portion 3a is returned to the position below the word "ON" from the position below the word "OFF", then the state of the tape cartridge 1 can be returned from unrecordable to recordable.

Next, as shown in FIG. 1B and FIG. 3C, when the tab portion 3a is disposed below the word "WORM", the top end of the engagement piece 3b engages with the third engagement portion 8c. By this, the write protect member 3 is retained in a third position and is prevented from moving toward the second engagement portion position 8b (i.e., the second position). At this time, the detection target portion 3d of the write protect member 3 has been pulled further inside of the case 2. When the tape cartridge in this state is loaded into the drive, the detection member 5 of the drive does not come into contact with the detection target portion 3d. Thus, the drive recognizes that recording onto the magnetic tape is not allowed. Therefore, once the tape 3 is retained in the third position, the tape cartridge 1 is put in a permanently unrecordable state.

As described above, in the tape cartridge 1, the guide wall 8 as a retention member is capable of reversibly retaining the write protect member 3 in the first position and the second position and irreversibly retaining the write protect member 3 in the third position, which allows switchover between a recordable state and an unrecordable state and enables users to put the tape cartridge in the state that recording is permanently inhibited (permanently unrecordable state) at an arbitrary time when users determine that data needs to be protected.

The shape of the first engagement portion 8a and the second engagement portion 8b is not particularly limited as long as the first engagement portion 8a and the second engagement portion 8b can temporarily retain the engagement piece 3b. It is preferable that each of the first engagement portion 8a and the second engagement portion 8b is, for example as shown in FIG. 3A, a recess portion formed between a pair of protruding portions when the protruding portions are formed on a face of the plate portion on the side of the write protect member 3. Particularly, it is preferable that the protruding portion is, for example, in a semispherical shape having a curved face with a central portion higher than a peripheral portion. Since the first engagement portion 8a and the second engagement portion 8b are the groove portions each formed between a pair of the semispherical protruding portion, it becomes possible to obtain both appropriate retention power to retain the engagement piece 3b and sliding operability of the write protect member 3. It is to be noted that the retention power to retain the engagement piece 3b by the first engagement portion 8a and the second engagement portion 8b as well as the sliding operability of the write protect member 3 may be set arbitrarily by adjusting the height or the shape of the protruding portions.

The shape of the third engagement portion 8c is not particularly limited as long as the third engagement portion 8c can retain the engagement piece 3b and prevent the write protect member 3 retained in the third position from sliding toward the second engagement portion 8b (i.e., the second position). It is preferable that the third engagement portion 8c has, for example, a recess portion having a bottom face on the side of the second engagement portion 8b. This is because engaging the protrusion 3c of the engagement piece 3b with the recess portion can credibly prevent the write protect member 3 from sliding toward the second engagement portion 8b. Particularly, it is preferable that the third engagement portion 8c has a curved face becoming higher from the plate portion in a direction from the side of the second engagement portion 8b to the side of the recess portion for example. This is because engagement of the protrusion 3c with the recess portion can be made smoothly.

The material and shape of the engagement piece 3b are not particularly limited as long as the engagement piece 3b can prevent the write protect member 3 temporarily retained by the first engagement portion 8a and the second engagement portion 8b and retained in the third position from sliding toward the second engagement portion 8b. Appropriate characteristics of the engagement piece 3b such as elasticity and rigidity should be determined by appropriate selection of the material and shape of the engagement piece 3b. Acceptable materials of the engagement piece 3b include those identical to the materials of the case 2 such as polycarbonate (PC) resins, acrylonitrile-butadien-styrene (ABS) resins and polyoxymethylene (POM) resins.

Moreover, as shown in FIG. 3A, it is preferable that the guide wall 8 further has a fourth engagement portion 8d formed between the second engagement portion 8b and the third engagement portion 8c. The guide wall 8 having the fourth engagement portion 8d between the second engagement portion 8b and the third engagement portion 8c can prevent the tape cartridge from being immediately put in a permanently unrecordable state by erroneous operation.

Second Embodiment

Figure 4:
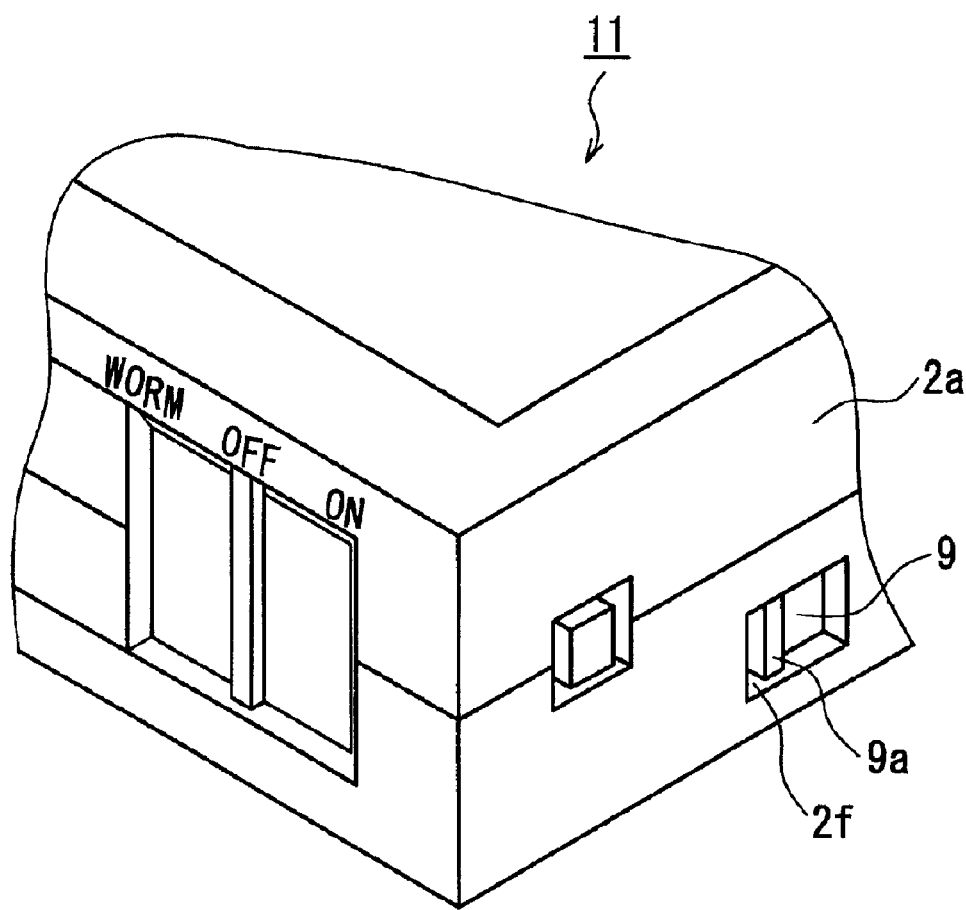
FIG. 4 is a perspective view showing one example of a tape cartridge of a second embodiment.
Figure 5A:
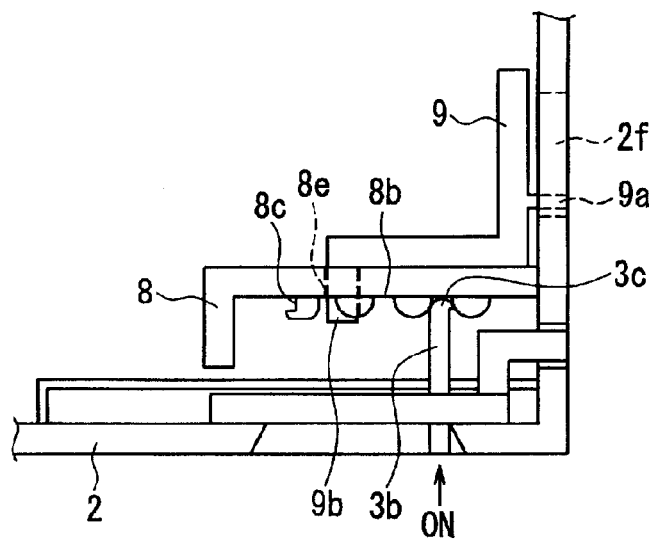
FIG. 5A is a plane view showing a write protect member constituting the tape cartridge shown in FIG. 4 in the state of being retained in a first position.
Figure 5B:
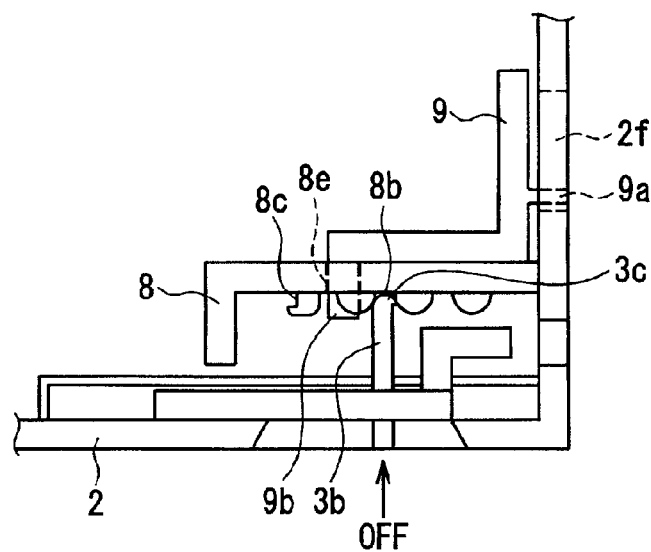
FIG. 5B is a plane view showing the write protect member in the state of being retained in a second position.
Figure 5C:
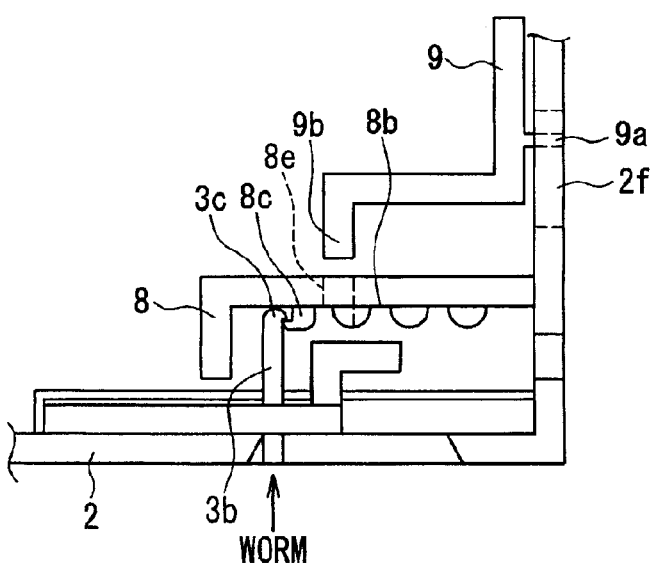
FIG. 5C is a plane view showing the write protect member in the state of being retained in a third position.

FIG. 4 is a perspective view showing the tape cartridge in this embodiment, while FIGS. 5A to 5C are plane views showing one example of a write protect structure in the tape cartridge shown in FIG. 4 without a upper cover 2a in FIG. 4.

As shown in FIG. 4 and FIGS. 5A to 5C, the tape cartridge 11 has a safety lock member 9, and a through hole 8e is formed between the second engagement portion 8b and the third engagement portion 8c of the guide wall 8. Except this point, the tape cartridge 11 is identical in structure to the tape cartridge in the First Embodiment, and therefore has the same effects.

The safety lock member 9 includes an operation portion 9a and a stopper wall 9b. The operation portion 9a is disposed inside an opening 2f formed on, for example, a lateral face of the case 2 so that the safety lock member 9 is operable from the outside of the case 2. The sliding direction of the safety lock member 9 is orthogonal to the plate portion of the guide wall 8, and sliding operation of the operation portion 9a enables the stopper wall 9b to penetrate the through hole 8e on the guide wall 8.

As shown in FIGS. 5A and 5B, unless the operation portion 9a is slid upward as viewed in the drawing and the stopper wall 9b is pulled out of the through hole 8e, the protrusion 3c of the engagement piece 3b cannot be engaged with the third engagement portion 8c. Thus, the tape cartridge having the safety lock member 9 capable of limiting movement of the write protect member 3 can prevent the tape cartridge 11 from being immediately put in a permanently unrecordable state by erroneous operation.

Third Embodiment

Figure 6A:
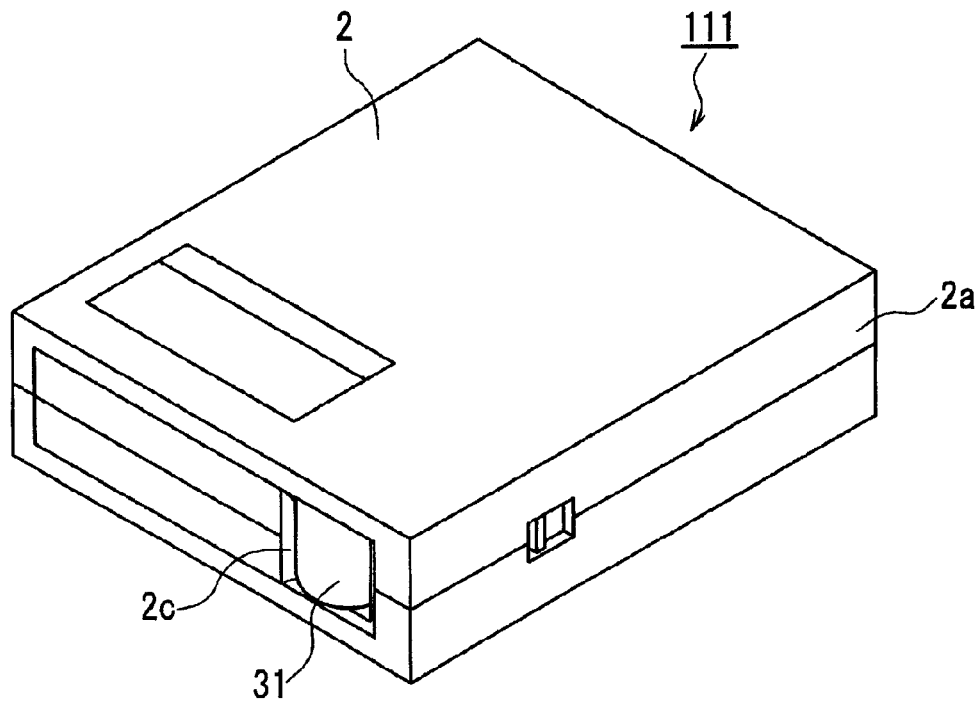
Figure 6B:
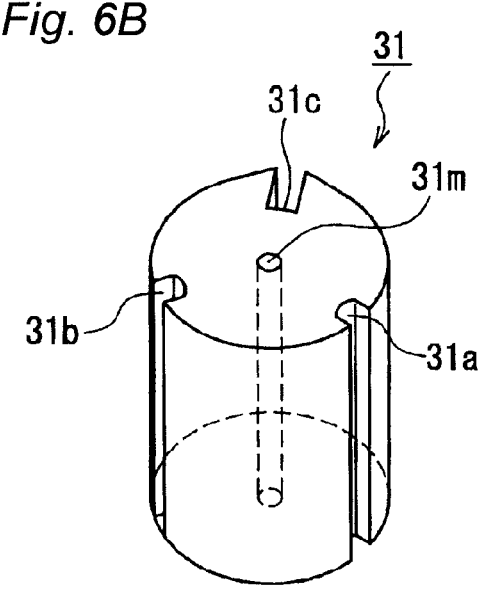
FIG. 6B and FIG. 6C are perspective views showing one example of a write protect member constituting the tape cartridge shown in FIG. 6A.
Figure 6C:
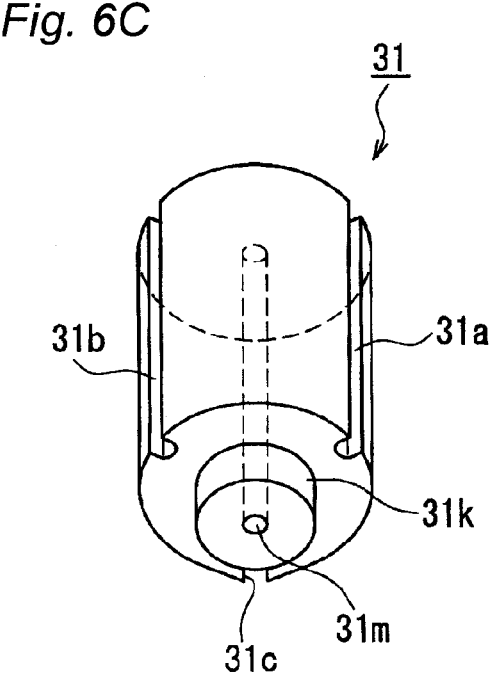
Figure 7A:
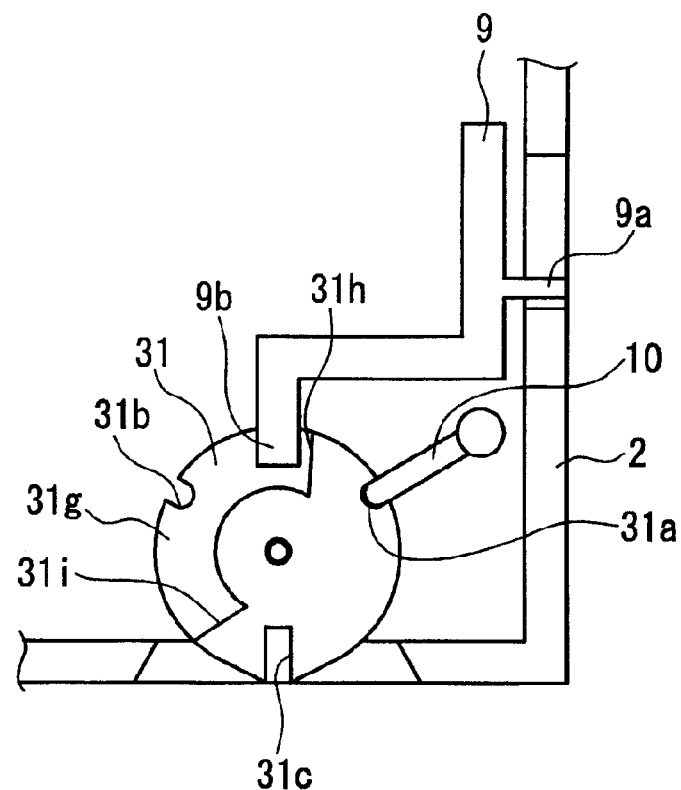
Figure 7B:
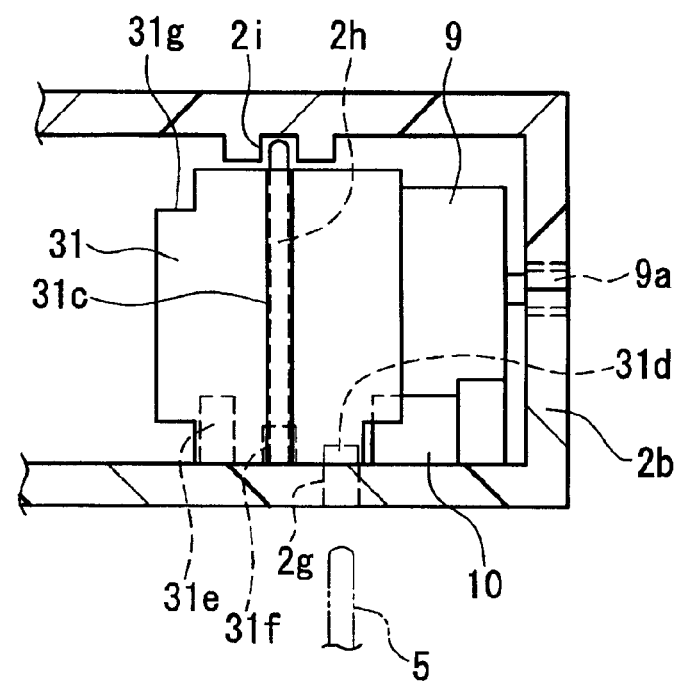
FIG. 7B is a fragmentary cross sectional view showing the write protect member constituting the tape cartridge shown in FIG. 6A in the state of being retained in the first position.
Figure 8A:
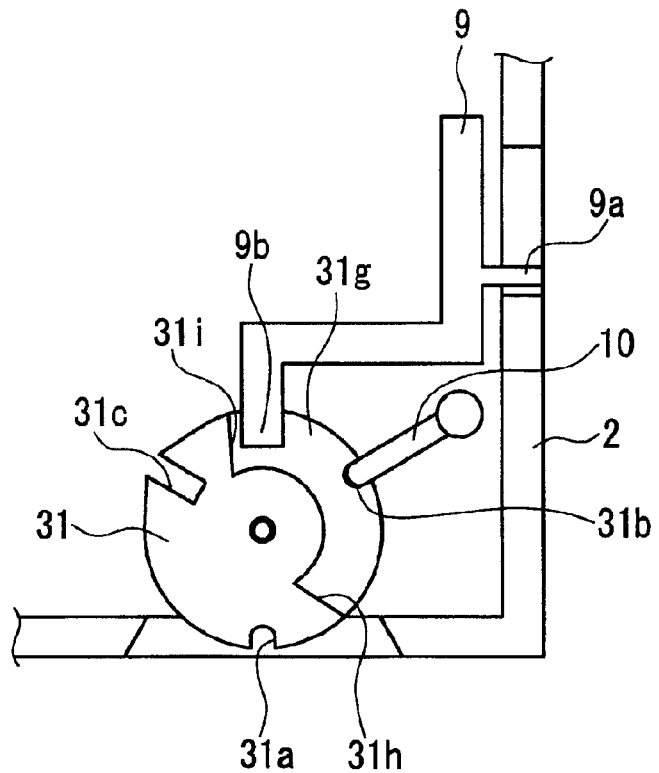
Figure 8B:
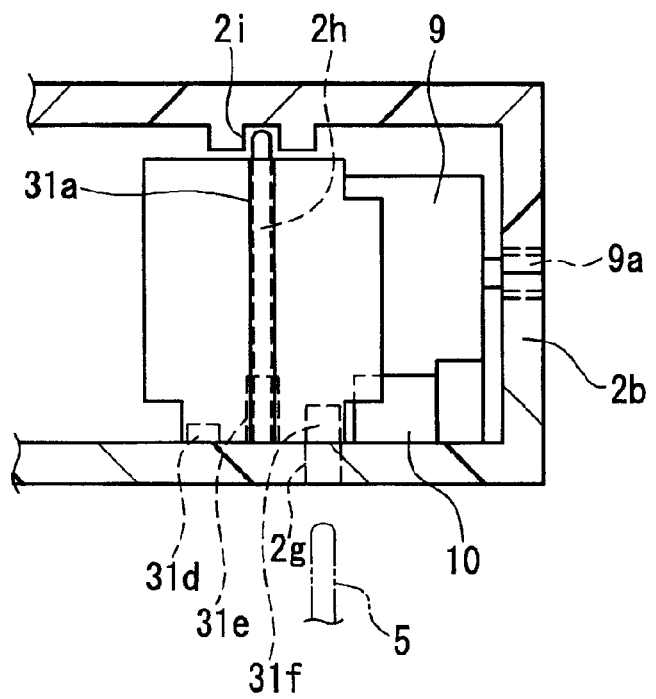
FIG. 8B is a fragmentary cross sectional view showing the write protect member constituting the tape cartridge shown in FIG. 6A in the state of being retained in the second position.
Figure 9A:
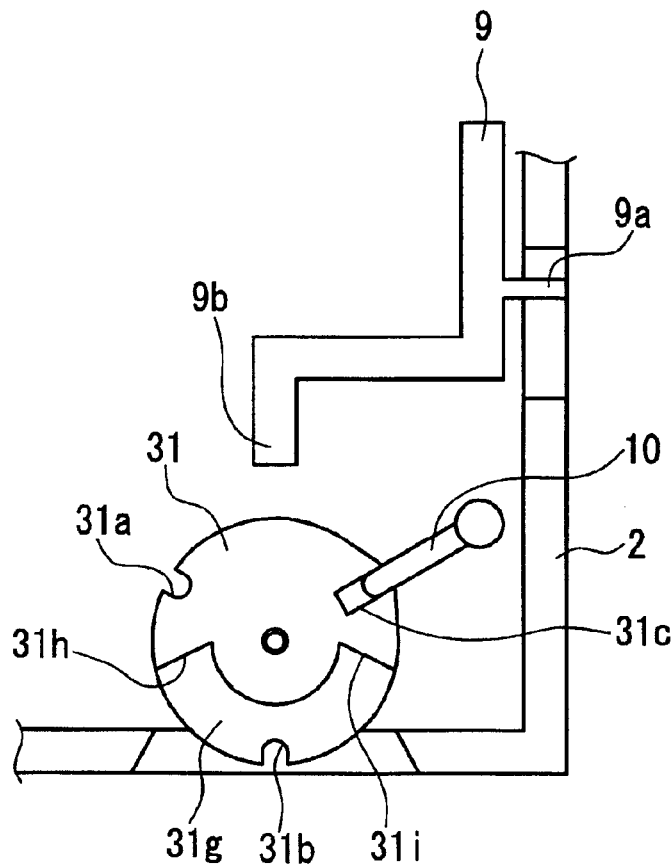
Figure 9B:
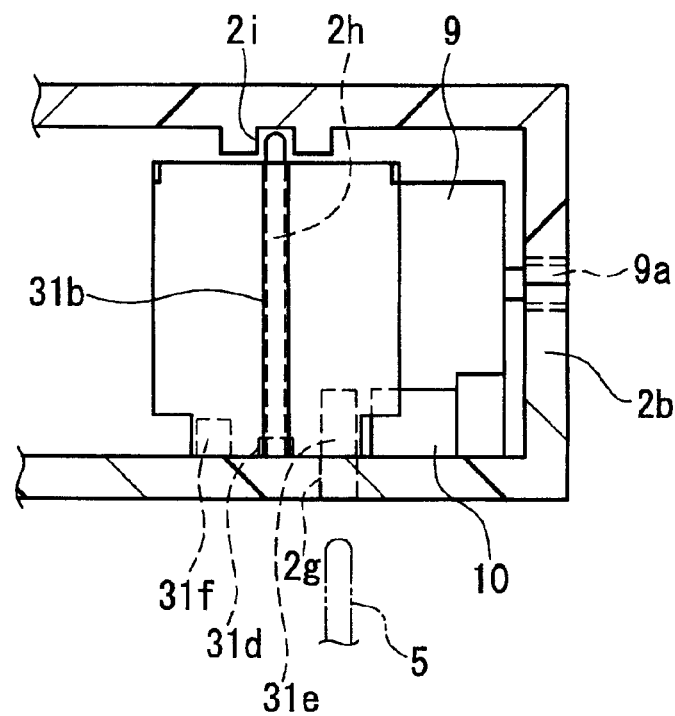
FIG. 9B is a fragmentary cross sectional view showing the write protect member constituting the tape cartridge shown in FIG. 6A in the state of being retained in the third position.

FIG. 6A is a perspective view showing a tape cartridge in this embodiment, while FIGS. 6B and 6C are perspective views showing a write protect member constituting the tape cartridge shown in FIG. 6A. FIGS. 7A, 8A and 9A are plane views for explaining a write protect structure of the tape cartridge shown in FIG. 6A without an upper cover 2a in FIG. 6A. FIGS. 7B, 8B and 9B are fragmentary cross sectional view for explaining the write protect structure of the tape cartridge shown in FIG. 6A. It is to be noted that only the case 2 is shown in cross section in FIGS. 7B, 8B and 9B for convenience of explanation.

As shown in FIGS. 6A to 9B, a tape cartridge 111 in this embodiment is identical in structure to the tape cartridge in the second embodiment except the configuration of a write protect member 31 and a retention member capable of retaining the write protect member 31 in a specified position, and therefore has the same effects.

As shown in FIGS. 6A to 6C, the write protect member 31 is in an almost cylindrical shape. The write protect member 31 is fixed onto the case 2 rotatably around its central axis.

In the example shown in FIGS. 6B and 6C, the write protect member 31 has a through hole 31m. By inserting a spindle 2h protruding on a lower cover 2b of the case 2 (see FIGS. 7B, 8B and 9B) into the through hole 31m, the write protect member 31 is rotatably fixed onto the case 2. Oscillation of the spindle 2h is suppressed by a bearing 2i provided on the upper cover 2a of the case 2 (see FIGS. 7B, 8B and 9B) By rotating around the spindle 2h, the write protect member 31 rotates around its central axis. Moreover, the write protect member 31 has a small diameter portion 31k. The rotational operation of the write protect member 31 can be performed from the operation window 2c (see FIG. 6A) formed on, for example, the rear face of the case 2.

Further, the write protect member 31 has a first engagement groove 31a, a second engagement groove 31b and a third engagement groove 31c formed in the circumferential direction in this order. The third engagement groove 31c has a depth larger than that of the first engagement groove 31a and the second engagement groove 31b. These engagement grooves are formed at, for example, almost 120 degree interval.

As shown in FIGS. 7A to 9B, in the tape cartridge in the present embodiment, the retention member is a retention piece 10 fixed in a specified position on the case 2. The retention piece 10 is, for example, in a plate shape whose principal face is disposed so as to be parallel to the thickness direction of the case 2, and only one end portion side thereof is fixed onto the case 2. It is preferable that the retention piece 10 is elastically deformable upon coming into contact with the surface of the write protect member 31.

As shown in FIGS. 7A to 9B, a plurality of recess portions 31d, 31e, 31f different in depth are formed on, for example, a bottom face of the write protect member 31 as detection target sections. These recess portions are formed at approximately 120 degree integrals. The propriety of recording onto the magnetic tape is determined by whether or not a detection member 5 of the drive inserted into a sensor hole 2g comes into contact with, for example, the bottom faces of the recess portions 31d, 31e, 31f. More particularly, recording is determined to be possible if the detection member 5 comes into contact with the bottom face of the recess portion, whereas recording is determined to be impossible if the detection member 5 does not come into contact with the bottom face of the recess portion. The sensor hole 2g is formed in a specified location on, for example, the lower cover 2b of the case.

When the write protect member 31 is rotated, as shown in FIG. 7A, the retention piece 10 is retained by the first engagement groove 31a, and the write protect member 31 is retained in a first position by the retention piece 10 (in other words, temporal engagement between the engagement piece 10 and the first engagement groove 31a makes the write protect member 31 to be retained in the first position by the retention piece 10). In this state, as shown in FIG. 7B, the recess portion 31d and the sensor hole 2g are linked. When the tape cartridge in this state is loaded into the drive, the detection member 5 of the drive inserted through the sensor hole 2g comes into contact with the bottom face of the recess portion 31d in the write protect member 3, and the drive recognizes that the tape cartridge is in a recordable state.

When the write protect member 31 is further rotated, as shown in FIG. 8A, the retention piece 10 is retained by the engagement groove 31b, and the write protect member 31 is retained in a second position by the retention piece 10 (in other words, temporal engagement between the retention piece 10 and the second engagement groove 31b makes the write protect member 31 to be retained in a second position by the retention piece 10). In this state, as shown in FIG. 8B, the recess portion 31f and the sensor hole 2g are linked. When the tape cartridge in this state is loaded into the drive, the detection member 5 of the drive inserted through the sensor hole 2g does not come into contact with the bottom face of the recess portion 31f. By this, the drive recognizes that the recording onto the magnetic tape is impossible.

When the write protect member 31 is furthermore rotated, as shown in FIG. 9A, the retention piece 10 is retained by the third engagement groove 31c, and the write protect member 31 is retained in a third position by the retention piece 10 (in other words, temporal engagement between the retention piece 10 and the third engagement groove 31c makes the write protect member 31 to be retained in the third position by the retention piece 10). In this state, as shown in FIG. 9B, the recess portion 31e and the sensor hole 2g are linked. When the tape cartridge in this state is loaded into the drive, the detection member 5 of the drive inserted through the sensor hole 2g does not come into contact with the bottom face of the recess portion 31e. By this, the drive recognizes that the recording onto the magnetic tape is impossible.

The shapes of the first engagement groove 31a and the second engagement groove 31b are not particularly limited as long as they can temporarily retain the retention piece 10. The specific shapes of the first engagement groove 31a and the second engagement groove 31b should be determined in consideration of elasticity and rigidity of the retention piece 10.

The shape of the third engagement groove 31c is not particularly limited as long as the third engagement groove 31c can prevent the write protect member 31 retained in the third position by the retention piece 10 from rotating. The specific shape of the third engagement groove 31c should be determined in consideration of elasticity and rigidity of the retention piece 10.

The material and the shape of the retention piece 10 are not particularly limited as long as the retention piece 10 can be temporarily retained by the first engagement groove 31a and the second engagement groove 31b and can prevent the write protect member 31 porarily retained by the first engagement groove 31a and the second engagement groove 31b and retained in the third position from rotating. Appropriate characteristics of the retention piece 10 such as elasticity and rigidity should be determined by appropriate selection of the material and shape. Acceptable materials of the retention piece 10 include those identical to the materials of the case 2 such as polycarbonate (PC) resins, acrylonitrile-butadien-styrene (ABS) resins and polyoxymethylene (POM) resins.

Moreover, it is preferable that the write protect member 31 further has a fourth engagement groove (unshown) formed between the second engagement groove 31b and the third engagement groove 31c. The write protect member 31 having the fourth engagement groove formed between the second engagement groove 31b and the third engagement groove 31c can prevent the tape cartridge from being immediately put in a permanently unrecordable state by erroneous operation.

Moreover, as shown in FIGS. 7A to 9B, it is preferable that the write protect member 31 includes a notch portion 31g formed along the circumferential direction between the first engagement groove 31a and the third engagement groove 31c sandwiching the second engagement groove 31b. Moreover, it is preferable that the tape cartridge has the safety lock member 9. The safety lock member 9 has an operation portion 9a operable from the outside of the case and a stopper wall 9b. As shown in FIGS. 7A and 8A, the stopper wall 9b can come into contact with both circumferential end walls 31h, 31i of the notch portion 31g in the state of being disposed inside the notch portion 31g.

However, as shown in FIG. 7A and FIG. 8A, unless the operation portion 9a is slid upward as viewed in the drawing and the stopper wall 9b is pulled out of the notch portion 31g, the retention piece 10 cannot be engaged with the third engagement groove 31c (see FIG. 9A). Thus, the tape cartridge having the safety lock member 9 capable of limiting rotation of the write protect member 31 can prevent the tape cartridge from being immediately put in a permanently unrecordable state by erroneous operation.

It is to be noted that in order to inhibit replacement of the magnetic tape and components of the cartridge by disassembling, the upper cover and the lower cover of the case may be welded with ultrasonic waves or fastened with nonstandard screws, the case may adopt snap-fit structure, or these methods may be combined. Moreover, the tape cartridge may have a means to easily notify that the tape cartridge has been disassembled.

The tape cartridge of the present invention allows switchover between a recordable state and an unrecordable state and enables users to put the tape cartridge in a permanently unrecordable state at an arbitrary time when users determine that data needs to be protected, which makes the tape cartridge useful as a tape cartridge for backup.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A tape cartridge, comprising:
   a case;
   a magnetic tape stored in the case; and
   a write protect structure for blocking information recording onto the magnetic tape, wherein
   the write protect structure comprises: a slidable or rotatable write protect member; and a retention member capable of retaining the write protect member in a specified position, and
   the retention member is capable of reversibly retaining the write protect member at least in a first position and a second position and irreversibly retaining the write protect member in a third position, wherein information recording onto the magnetic tape is blocked when the write protect member is retained by the retention member in the third position, and the write protect member is operable from the outside of the case so as to move the write protect member from the second position to the third position without disassembly of the case;

wherein the write protect member comprises an engagement piece slidable in a specified range and protruding to an inside of the case, the retention member is a guide wall fixed onto the case, and the guide wall comprises:

a first engagement portion for retaining the engagement piece so as to be able to retain the write protect member in the first position;

a second engagement portion for retaining the engagement piece so as to be able to retain the write protect member in the second position; and a third engagement portion for retaining the engagement piece so as to be able to retain the write protect member in the third position and preventing the write protect member retained in the third position from moving toward the second engagement portion, each of the engagement portions being formed along a sliding direction of the write protect member in this order; and wherein the engagement piece has a protrusion in its top end, and the third engagement portion comprises a recess portion having a bottom face on a side of the second engagement portion.

2. The tape cartridge as defined in claim 1, wherein the guide wall further comprises a fourth engagement portion formed between the second engagement portion and the third engagement portion.

3. A tape cartridge, comprising:

a case;

a magnetic tape stored in the case; and a write protect structure for blocking information recording onto the magnetic tape, wherein the write protect structure comprises: a slidable or rotatable write protect member; and a retention member capable of retaining the write protect member in a specified position, and the retention member is capable of reversibly retaining the write protect member at least in a first position and a second position and irreversibly retaining the write protect member in a third position, wherein information recording onto the magnetic tape is blocked when the write protect member is retained by the retention member in the third position, and the write protect member is operable from the outside of the case so as to move the write protect member from the second position to the third position without disassembly of the case;

wherein the write protect member comprises an engagement piece slidable in a specified range and protruding to an inside of the case, the retention member is a guide wall fixed onto the case, and the guide wall comprises:

a first engagement portion for retaining the engagement piece so as to be able to retain the write protect member in the first position;

a second engagement portion for retaining the engagement piece so as to be able to retain the write protect member in the second position; and a third engagement portion for retaining the engagement piece so as to be able to retain the write protect member in the third position and preventing the write protect member retained in the third position from moving toward the second engagement portion, each of the engagement portions being formed along a sliding direction of the write protect member in this order; and wherein said tape cartridge further comprises a safety lock member, wherein a through hole is formed between the second engagement portion and the third engagement portion of the guide wall, and the safety lock member comprises: an operation portion operable from an outside of the case; and a stopper wall capable of penetrating the through hole by operation of the operation portion.

4. The tape cartridge as defined in claim 3, wherein the guide wall further comprises a fourth engagement portion formed between the second engagement portion and the third engagement portion.

5. A tape cartridge, comprising:

a case;

a magnetic tape stored in the case; and a write protect structure for blocking information recording onto the magnetic tape, wherein the write protect structure comprises: a slidable or rotatable write protect member; and a retention member capable of retaining the write protect member in a specified position, and the retention member is capable of reversibly retaining the write protect member at least in a first position and a second position and irreversibly retaining the write protect member in a third position, wherein information recording onto the magnetic tape is blocked when the write protect member is retained by the retention member in the third position, and the write protect member is operable from the outside of the case so as to move the write protect member from the second position to the third position without disassembly of the case;

wherein the retention member is a retention piece fixed onto the case, the write protect member is in an almost cylindrical shape and is fixed onto the case rotatably around its central axis, and the write protect member comprises:

a first engagement groove for retaining the retention piece so as to be able to retain the write protect member in the first position;

a second engagement groove for retaining the retention piece so as to be able to retain the write protect member in the second position; and a third engagement groove for retaining the retention piece so as to be able to retain the write protect member in the third position and having a depth larger than the first engagement groove and the second engagement groove, each of the engagement grooves being formed in a circumferential direction in this order.

6. The tape cartridge as defined in claim 5, wherein the write protect member further comprises a fourth engagement groove formed between the second engagement groove and the third engagement groove.

7. The tape cartridge as defined in claim 5, further comprising a safety lock member, wherein
the write protect member comprises a notch portion formed along a circumferential direction between the first engagement groove and the third engagement groove sandwiching the second engagement groove, and
the safety lock member comprises: an operation portion operable from an outside of the case; and a stopper wall capable of coming into contact with both circumferential end walls of the notch portion by operation of the operation portion.

8. The tape cartridge as defined in claim 5, wherein a sensor hole is formed on the case, and
the write protect member comprises a detection target portion visible from the sensor hole.

* * * * *